(12) United States Patent
Wu

(10) Patent No.: US 9,004,535 B2
(45) Date of Patent: Apr. 14, 2015

(54) CHASSIS FOR AN ELECTRIC VEHICLE

(71) Applicant: Energy Control Limited, Tortola (VG)

(72) Inventor: Donald P. H. Wu, Hsinchu County (TW)

(73) Assignee: Energy Control Limited. (VG)

( * ) Notice: Subject to any disclaimer, the term of this patent is extended or adjusted under 35 U.S.C. 154(b) by 264 days.

(21) Appl. No.: 13/763,873

(22) Filed: Feb. 11, 2013

(65) Prior Publication Data

US 2014/0224557 A1 Aug. 14, 2014

Related U.S. Application Data

(63) Continuation-in-part of application No. 13/180,883, filed on Jul. 12, 2011, now abandoned.

(51) Int. Cl.
| | |
|---|---|
| B62D 21/02 | (2006.01) |
| B60K 1/04 | (2006.01) |
| B62D 23/00 | (2006.01) |
| B62D 25/20 | (2006.01) |
| B62D 31/00 | (2006.01) |

(52) U.S. Cl.
CPC ............ *B60K 1/04* (2013.01); *B62D 23/005* (2013.01); *B62D 25/2009* (2013.01); *B62D 31/003* (2013.01); *B60K 2001/0422* (2013.01)

(58) Field of Classification Search
CPC ....... B62D 21/02; B62D 23/005; B62D 23/00
USPC ........... 180/311; 280/781, 796, 798; 296/205, 296/203.01
See application file for complete search history.

(56) References Cited

U.S. PATENT DOCUMENTS

| | | | | |
|---|---|---|---|---|
| 872,774 | A * | 12/1907 | Van Ferls et al. | 280/790 |
| 4,217,970 | A * | 8/1980 | Chika | 180/298 |
| 5,921,339 | A * | 7/1999 | Matsuura | 180/219 |
| 5,941,327 | A * | 8/1999 | Wu | 180/65.1 |
| 6,371,767 | B1 * | 4/2002 | Libby | 434/373 |
| 6,412,856 | B1 * | 7/2002 | Kajikawa et al. | 296/203.01 |
| 7,306,069 | B2 * | 12/2007 | Takeshima et al. | 180/312 |
| 7,802,816 | B2 * | 9/2010 | McGuire | 280/788 |
| 8,672,354 | B2 * | 3/2014 | Kim et al. | 280/783 |
| 2002/0079146 | A1 * | 6/2002 | Chen | 180/65.1 |
| 2006/0192375 | A1 * | 8/2006 | Davis et al. | 280/781 |
| 2013/0015012 | A1 * | 1/2013 | Wu | 180/312 |

* cited by examiner

*Primary Examiner* — James English
(74) *Attorney, Agent, or Firm* — Patent Office of Bang Shia

(57) ABSTRACT

A chassis for an electric vehicle comprises: a base frame, a front frame, a rear frame, two side frames, four suspension devices and four wheels. The front frame and the rear frame have the front arc-shaped tube and the arc-shaped rear tube fixed to the base frame, the arc-shaped tubes can not only reduce the number of tubes required but also increase the area of thrust force as compared to the straight tubes. Besides, the arc of the arc-shaped tubes avoids a connection point of an acute angle. Moreover, the height is larger than the width, which will produce less torque on the base frame as compared to that if the height is smaller than the width, thus preventing the torque acted on the base frame from damaging the connection points and improving the structural strength of the chassis at the connection points.

7 Claims, 9 Drawing Sheets

CHASSIS FOR AN ELECTRIC VEHICLE

This application is a continuation in part of U.S. patent application Ser. No. 13/180,883, which claims the benefit of the earlier filing date of Jul. 12, 2011. Claim 1 of this application is revised from claim 1 of the U.S. patent application Ser. No. 13/180,883, claims 2 and 3 of this application are new, and claims 4-7 of this application correspond to claims 2-5 of the U.S. patent application Ser. No. 13/180,883.

BACKGROUND OF THE INVENTION

1. Field of the Invention

The present invention relates to a chassis, and more particularly to a chassis for an electric vehicle.

2. Description of the Prior Art

Vehicle is an indispensible part of our lives, and every vehicle has a chassis on which the rest parts of the vehicle are mounted, in other words, the chassis has to bear the load of the vehicle. Therefore, the strength of a chassis has a great influence on the vehicle's safety.

As shown in FIG. 1, a conventional vehicle chassis X comprises a plurality of tubes X1 connected together, and the angles between connected tubes X1 are either right angles or acute angles. The strength of the chassis determines the safety of a vehicle, and the structural weak points lie at the connection point between the tubes X1. When the angles are all right and acute angles, stress concentration will occur, which will cause structural damage and safety problem when the chassis X is overloaded or subjected to an impact force.

FIG. 2 shows another conventional vehicle chassis which includes a base frame Y and an upper frame Z, and the base frame Y, as shown in FIG. 3, includes two opposite middle beams Y1 with two ends slantingly connected to one ends of two first extending beams Y2, and another ends of the first extending beams Y2 are connected to two second extending beams Y3, respectively. The middle beams Y1, the first extending beams Y2 and the second extending beams Y3 are all straight beams without a radius of curvature. The middle beams Y1 are connected to the first extending beams Y2 by two first arc-shaped connectors Y4, and the first extending beams Y2 are connected to the second extending beams Y3 by two second arc-shaped connectors Y5, so that the arc of the arc-shaped connectors avoids a connection point of an acute angle and reduces stress concentration.

However, the base frame Y consists of the middle beams Y1 and the first and second extending beams Y2, Y3, which makes the assembly much difficult. Furthermore, the connection points between the respective beams have stress concentration and are still the weak points of the whole structure.

The present invention has arisen to mitigate and/or obviate the afore-described disadvantages.

SUMMARY OF THE INVENTION

The primary object of the present invention is to provide a chassis for an electric vehicle which is simplified in structure, improved in safety and structure strength, and has less structure weak points.

To achieve the above object, a chassis for an electric vehicle in accordance with the present invention comprises: a base frame, a front frame, a rear frame, two side frames, four suspension devices and four wheels.

The base frame is a rectangular structure formed by two side tubes, and includes a front tube and a rear tube connected at two ends of the two side tubes. The side tubes of the base frame extend in a width direction, and a direction perpendicular to the width direction is defined as a height direction. The front frame includes two arc-shaped front tubes with one end fixed to one end of the front tube of the base frame, and a front connecting tube connected between another end of the two arc-shaped front tubes. The rear frame includes two arc-shaped rear tubes with one end fixed to one end of the rear tube of the base frame, and a rear connecting tube connected between another end of the two arc-shaped rear tubes. Two of the four suspension devices each having one end fixed to the front frame and another end fixed to two of the four wheels, and another two of the four suspension devices each having one end fixed to one end of the rear connecting tube and having another end fixed to another two of the four wheels. The chassis is characterized in that each of the arc-shaped front tubes and rear tubes has an outer contour which is in the form of a consecutive curved line, and any arbitrary point on the outer contours has a radius of curve which is 220-650 mm, each of the arc-shaped front and rear tubes has a width in the width direction and has a height in the height direction, and the height is larger than the width.

Since the front frame and the rear frame have the front arc-shaped tube and the arc-shaped rear tube fixed to the base frame, arc-shaped tubes can not only reduce the number of tubes required but also increase the area of thrust force as compared to the straight tubes. Besides, the arc of the arc-shaped tubes avoids a connection point of an acute angle, thus preventing stress concentration while improving the structural strength of the chassis. Further, the arc-shaped front tube, the arc-shaped rear tube, the front connecting tube and the rear connecting tube are hollow, which contributes to light weight of the chassis. Moreover, the height is larger than the width, the arc-shaped front and rear tubes would have a relatively shorter length of arm as compared to that if the height is smaller than the width. Hence, the torque produced on the base frame by the front and rear tubes will be effectively reduced, thus preventing the torque acted on the base frame from damaging the connection points and improving the structural strength of the chassis at the connection points.

DETAILED DESCRIPTION OF THE PREFERRED EMBODIMENTS

Figure 1:
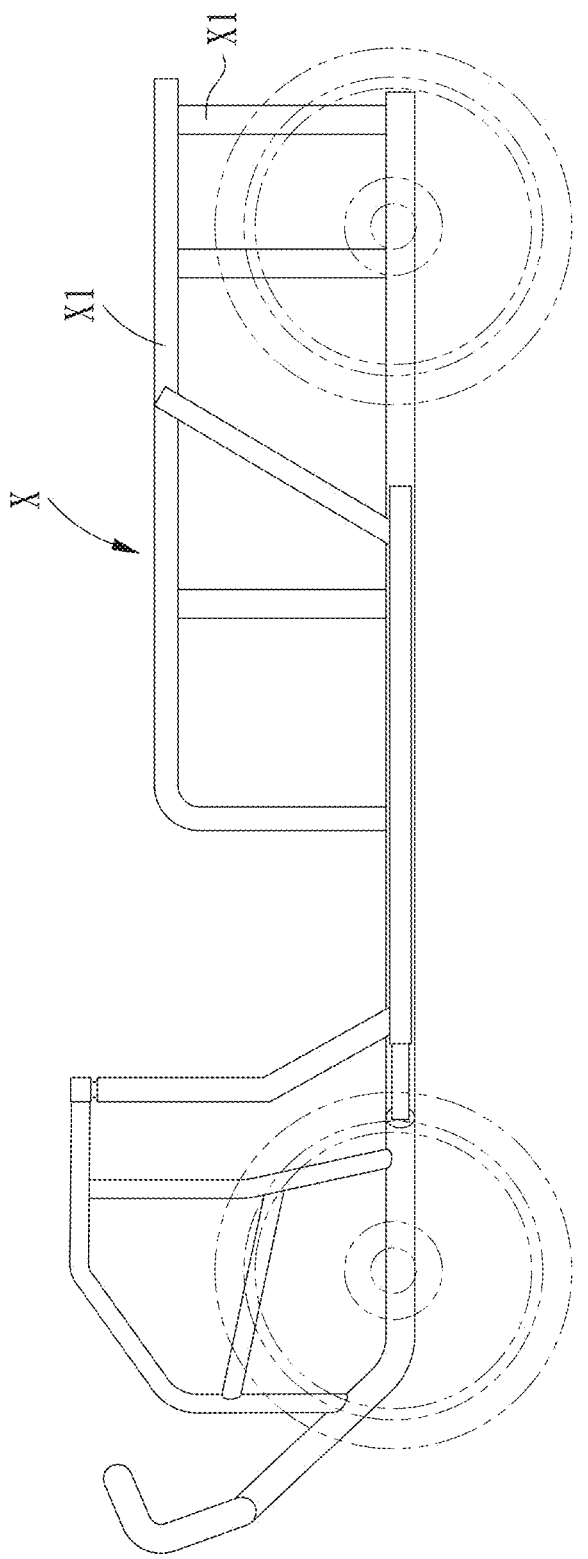
FIG. 1 is an illustrative view of a conventional chassis.
Figure 2:
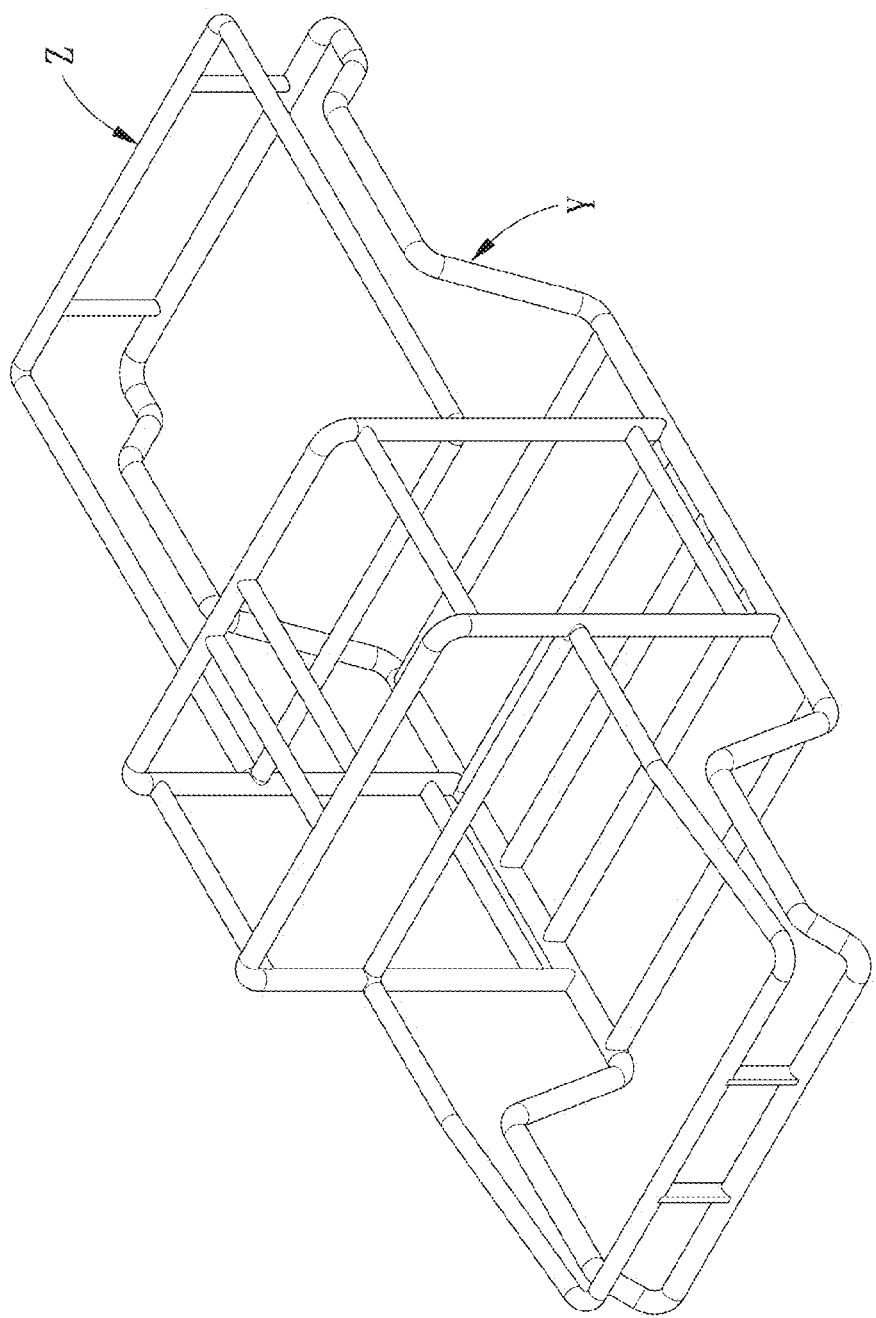
FIG. 2 is an illustrative view of another conventional chassis.

The present invention will be clearer from the following description when viewed together with the accompanying drawings, which show, for purpose of illustrations only, the preferred embodiment in accordance with the present invention.

Referring to FIGS. 4-9, a chassis for an electric vehicle in accordance with the present invention comprises a base frame 10, a front frame 20, a rear frame 30 and two side frames 40.

The base frame 10 is a rectangular structure formed by two side tubes 111, and includes a front tube 112 and a rear tube 113 connected at two ends of the two side tubes 111. The base frame 10 is further provided with a container 12 for storing battery, and a plurality of reinforced tubes 13 for improving the load capacity of the base frame 10. The side tubes 111 of the base frame 10 extend in a width direction S1, and a direction perpendicular to the width direction S1 is defined as a height direction S2.

The front frame 20 includes two arc-shaped front tubes 21 with one end fixed to one end of the front tube 112 of the base frame 10 and a front connecting tube 22 connected between another end of the two arc-shaped front tubes 21. The arc-shaped front tubes 21 and the front connecting tube 22 are square in cross section.

The rear frame 30 includes two arc-shaped rear tubes 31 with one end fixed to one end of the rear tube 113 of the base frame 10, and a rear connecting tube 32 connected between another end of the two arc-shaped rear tubes 31. The arc-shaped rear tubes 31 and the rear connecting tube 32 are square in cross section.

Figure 5:
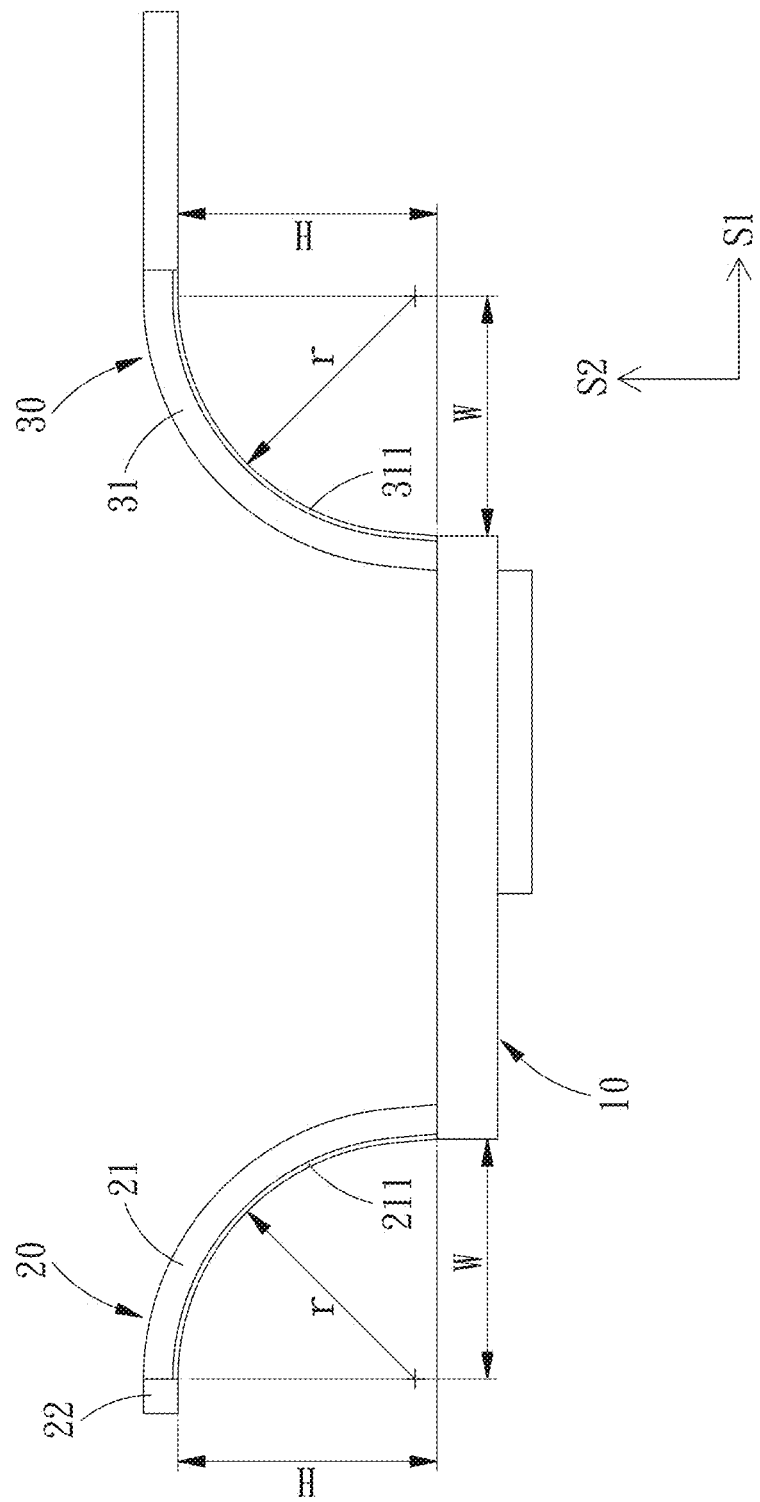
FIG. 5 is a plan view of a part of the chassis of the present invention.
Figure 6:
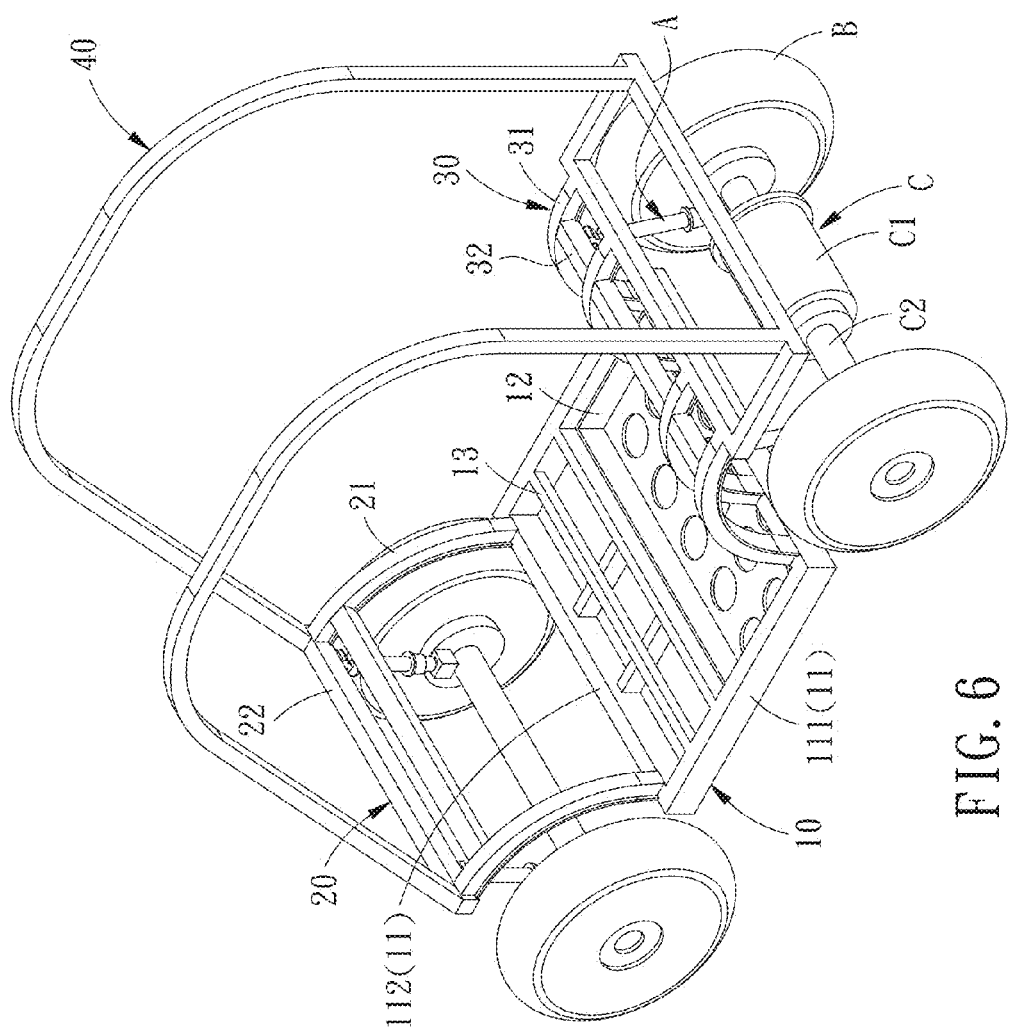
FIG. 6 shows that on the chassis for an electric vehicle in accordance with the present invention are mounted wheels and suspensions.
Figure 7:
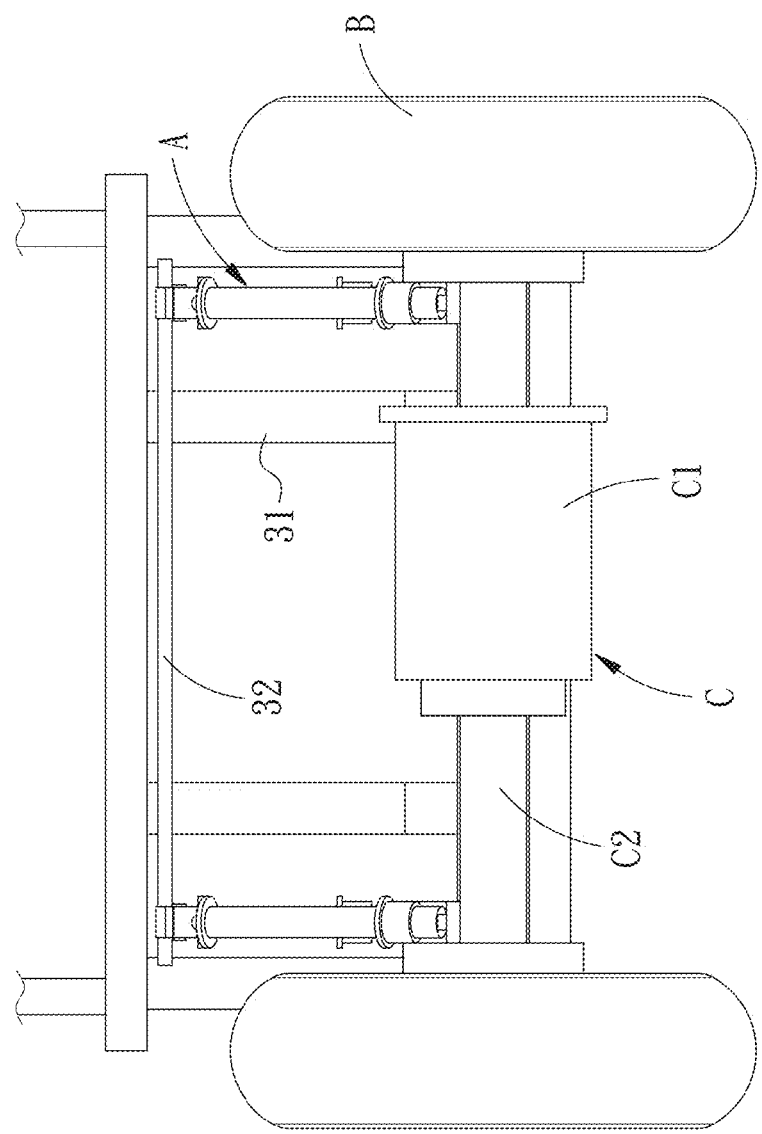
FIG. 7 is a front view of a part of FIG. 4.
Figure 8:
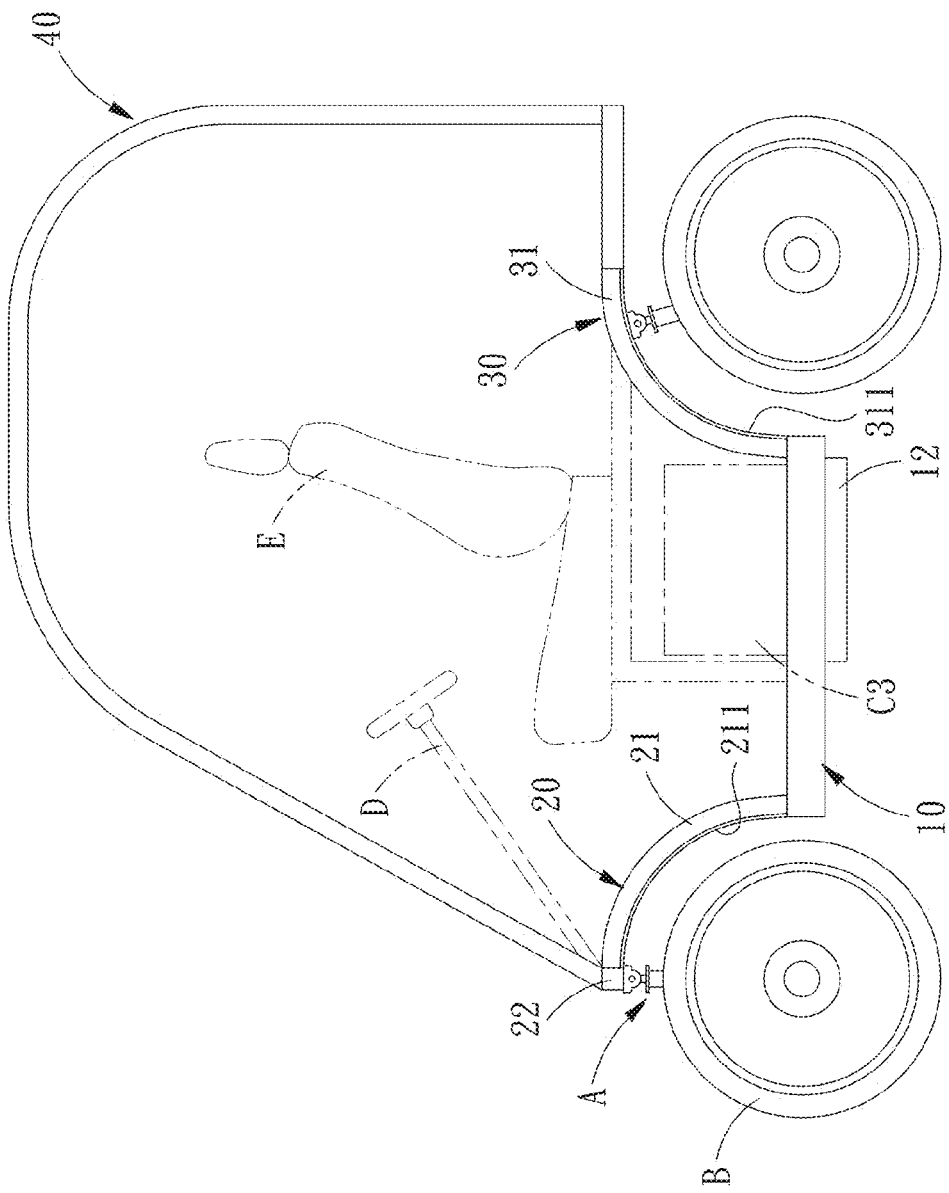
FIG. 8 is an illustrative view showing a completed assembly of an electric vehicle.
Figure 9:
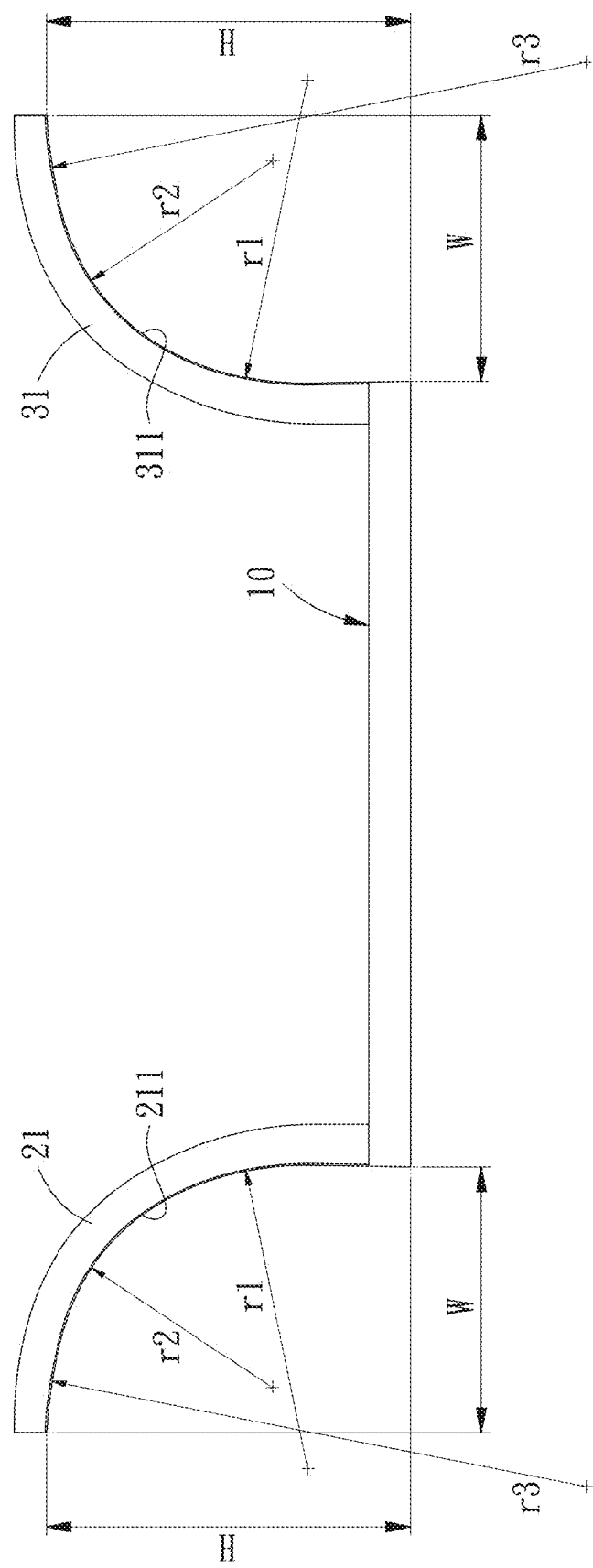
FIG. 9 is another plan view of a part of the chassis of the present invention.

Each of the arc-shaped front tubes 21 and rear tubes 31 has an outer contour 211, 311 between two ends thereof, each of the outer contours 211, 311 is a consecutive curved line, and any arbitrary point on the outer contours 211, 311 has a radius of curve r which is 220-650 mm. The outer contours 211 and 311 have a single radius of curve r or a plurality of radii of curve. As shown in FIG. 5, the outer contours 211 and 311 of the arc-shaped front and rear tubes 21, 31 each has a single radius of curve r, namely, the radius of curvature r at any arbitrary point on the outer contours 211, 311 is the same (the radii of curvature of all points on the outer contours 211, 311 are the same). The width of each of the arc-shaped front and rear tubes 21, 31 in the width direction S1 is W, the height of each of the arc-shaped front and rear tubes 21, 31 in the height direction S2 is H, and H>W. The outer contours 211 and 311 can also have different radii of curve, for example, as shown in FIG. 9, each of the outer contours 211 and 311 has a first radius of curvature r1, a second radius of curvature r2, and a third radius of curvature r3, which are different from one another.

Each of the side frames 40 is an arc-shaped tube with both ends fixed to the front frame 20 and the rear frame 30, respectively.

The chassis in accordance with the present invention is used for mounting of four suspension devices A and four wheels B in such a manner that two of the four suspension devices A each have one end fixed to the front connecting tube 22 of the front frame 20 and another end fixed to two of the four wheels B, and another two of the four suspension devices A each have one end fixed to one end of the rear connecting tube 32 and have another end fixed to another two of the four wheels B. The load of the vehicle is pressed on the suspension devices A and finally on the wheels B through the front frame 20 and the rear frame 30. That is to say, the front frame 20 and the rear frame 30 bear the main load of the vehicle. Since the front frame 20 and the rear frame 30 have the arc-shaped front tube 21 and the arc-shaped rear tube 31 fixed to the base frame 10, and the arc-shaped front tube 21 and the arc-shaped rear tube 31 each have the outer contours 211, 311 which are consecutive curved lines, which can not only reduce the number of tubes required but also increase the area of thrust force as compared to the straight tubes. Besides, the consecutive curved lines of the outer contours 211, 311 of the arc-shaped tubes avoid a connection point of an acute angle, thus preventing stress concentration while improving the structural strength of the chassis.

Each of the arc-shaped front and rear tubes 21, 31 has a width W, and the arc-shaped front and rear tubes 21, 31 are located at two ends of the base frame 10. When the arc-shaped front and rear tubes 21, 31 are subjected to a force, so that the larger the width W is, the larger the torque that will be produced by the arc-shaped front and rear tubes 21, 31 with respect to the base frame 10. Since the arc-shaped front and rear tubes 21, 31 have the same arc length, when the height H is larger than the width W, the arc-shaped front and rear tubes 21, 31 would have a relatively shorter length of arm as compared to that if the height H is smaller than the width W. Hence, the torque produced on the base frame 10 by the front and rear tubes 21, 31 will be effectively reduced, thus preventing the torque acted on the base frame 10 from damaging the connection points and improving the structural strength of the chassis at the connection points.

Further, the arc-shaped front tube 21, the arc-shaped rear tube 31, the front connecting tube 22 and the rear connecting tube 32 are hollow, which contributes to light weight of the chassis.

Figure 3:
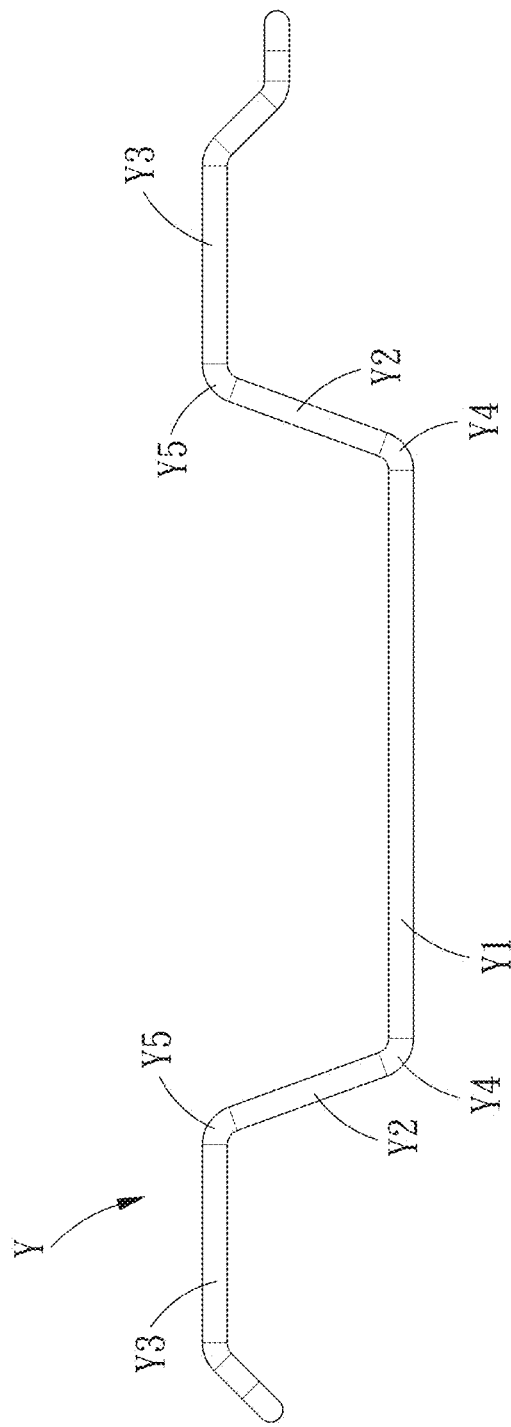
FIG. 3 shows the base frame of the chassis of FIG. 2.
Figure 4:
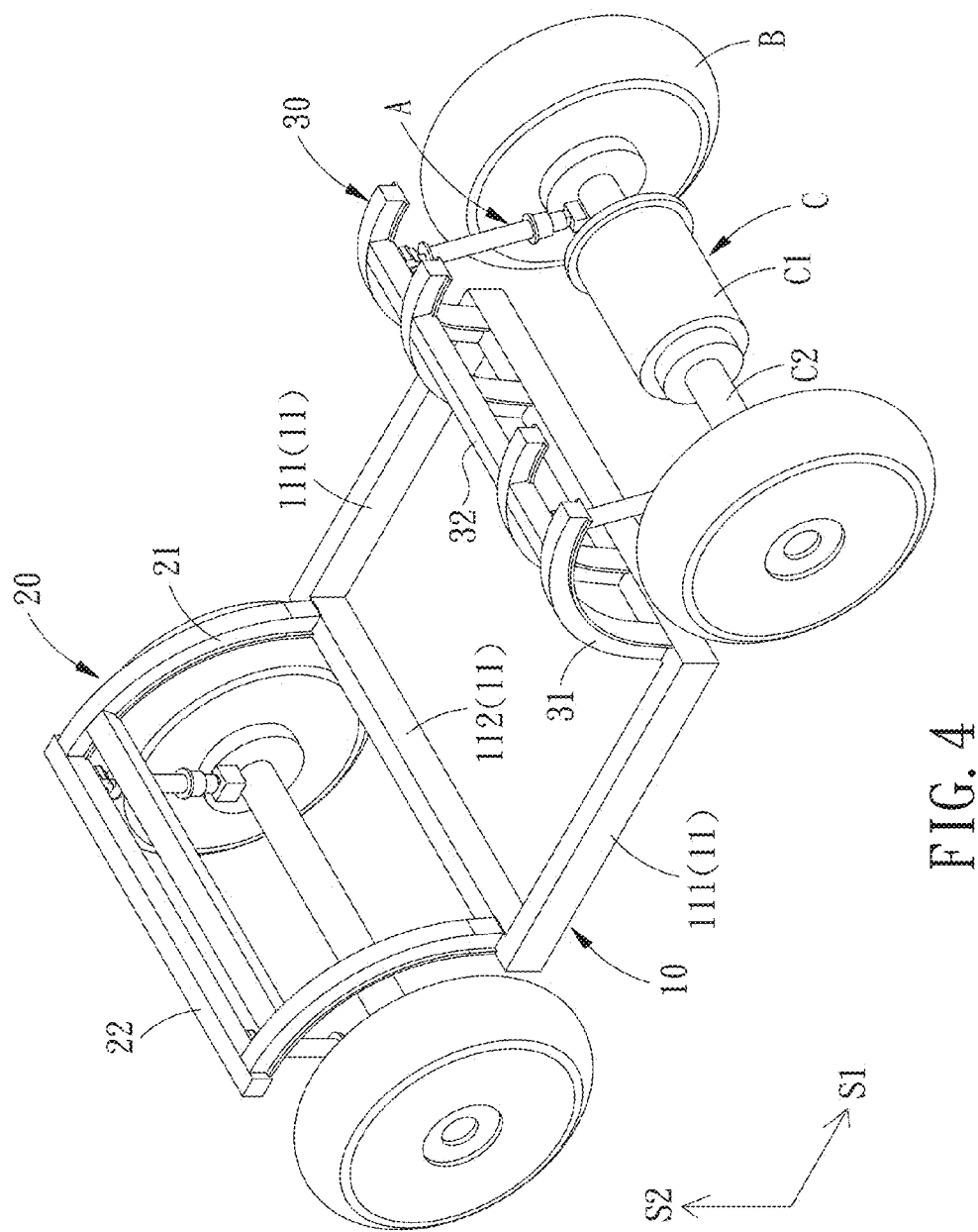
FIG. 4 is a perspective view of a chassis for an electric vehicle in accordance with the present invention.

Referring then to FIGS. 3 and 5, the chassis in accordance with the present invention is provided for the assembly of an electric vehicle. Hence, on the chassis are to be mounted a drive C, a control device D and a seat E. The drive C includes a motor C1, a drive shaft C2 and a plurality of batteries C3. The drive shaft C2 is driven by the motor C1 to rotate the two wheels B at the rear frame 30, and the motor C1 is electrically connected to the batteries C3.

The control device D is connected to the two wheels B at the front frame 20 to control the steering of the two wheels B at the front.

The seat E is mounted on the base frame 10.

While we have shown and described various embodiments in accordance with the present invention, it is clear to those skilled in the art that further embodiments may be made without departing from the scope of the present invention.

What is claimed is:

1. A chassis for an electric vehicle comprising:
a base frame, a front frame, a rear frame, four suspension devices, and four wheels, the base frame being a rectangular structure formed by two side tubes, a front tube and a rear tube connected at both ends of the two side tubes, the side tubes of the base frame extending in a width direction, and a direction perpendicular to the width direction being defined as a height direction; the front frame including two arc-shaped front tubes with one end fixed to one end of the front tube of the base frame, and a front connecting tube connected between another end of the two arc-shaped front tubes; the rear frame including two arc-shaped rear tubes with one end fixed to one end of the rear tube of the base frame, and a rear connecting tube connected between another end of the two arc-shaped rear tubes; two of the four suspension devices A each having one end fixed to the front frame and another end fixed to one of the four wheels, and another two of the four suspension devices each having one end fixed to one end of the rear connecting tube and having another end fixed to one of the four wheels; the chassis being characterized in that:
each of the arc-shaped front tubes and rear tubes has an outer contour which is in the form of a consecutive curved line, and any arbitrary point on the outer contours has a radius of curve which is 220-650 mm, each of the arc-shaped front and rear tubes has a width in the width direction and has a height in the height direction, and the height is larger than the width.

2. The chassis for an electric vehicle as claimed in claim 1, wherein the outer contours have a single radius of curve, and the radius of curvature at any arbitrary point on the outer contours is the same.

3. The chassis for an electric vehicle as claimed in claim 1, wherein the outer contours have a plurality of radii of curve.

4. The chassis for an electric vehicle as claimed in claim 1, wherein the base frame is further provided with a container for storing battery.

5. The chassis for an electric vehicle as claimed in claim 1, wherein the base frame is provided with a plurality of reinforced tubes for improving a load capacity of the base frame.

6. The chassis for an electric vehicle as claimed in claim 1, wherein the arc-shaped front tubes, the front connecting tube, the arc-shaped rear tubes and the rear connecting tube are hollow tubes.

7. The chassis for an electric vehicle as claimed in claim 1 further comprising two side frames each of which is an arc-shaped tube with both ends fixed to the front frame and the rear frame, respectively.

\* \* \* \* \*